US010739275B2

(12) United States Patent
Zhao et al.

(10) Patent No.: US 10,739,275 B2
(45) Date of Patent: Aug. 11, 2020

(54) SIMULTANEOUS MULTI-DIRECTIONAL LASER WAFER INSPECTION

(71) Applicant: KLA-Tencor Corporation, Milpitas, CA (US)

(72) Inventors: Guoheng Zhao, Palo Alto, CA (US); Sheng Liu, San Jose, CA (US); Ben-ming Benjamin Tsai, Saratoga, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 251 days.

(21) Appl. No.: 15/697,386

(22) Filed: Sep. 6, 2017

(65) Prior Publication Data

US 2018/0073993 A1 Mar. 15, 2018

Related U.S. Application Data

(60) Provisional application No. 62/395,086, filed on Sep. 15, 2016.

(51) Int. Cl.
G01N 21/95 (2006.01)
G06T 7/00 (2017.01)
(Continued)

(52) U.S. Cl.
CPC ..... *G01N 21/9501* (2013.01); *G01N 21/8806* (2013.01); *G01N 21/956* (2013.01);
(Continued)

(58) Field of Classification Search
CPC .......... G01N 21/9501; G01N 21/8806; G01N 21/956; G01N 2021/8825;
(Continued)

(56) References Cited

U.S. PATENT DOCUMENTS 5,864,394 A * 1/1999 Jordan, III ............. G01N 21/94
257/E21.53
5,917,588 A * 6/1999 Addiego ............ G01N 21/8806
356/237.2

(Continued)

FOREIGN PATENT DOCUMENTS

JP 2005156537 A 6/2005

OTHER PUBLICATIONS

"International Application No. PCT/US2017/051659 filed Sep. 14, 2017", International Search Report dated Dec. 22, 2017, 3 pages.
(Continued)

Primary Examiner — Manav Seth
(74) Attorney, Agent, or Firm — Kwan & Olynick LLP

(57) ABSTRACT

Disclosed is apparatus for inspecting a sample. The apparatus includes illumination optics for simultaneously directing a plurality of incident beams at a plurality of azimuth angles towards a sample and collection optics for directing a plurality of field portions of output light from two or more of the plurality of angles towards two or more corresponding sensors. The two or more sensors are arranged for receiving the field portions corresponding to two or more angles and generating two or more corresponding images. The apparatus further comprises a processor for analyzing the two or more images to detect defects on the sample.

22 Claims, 9 Drawing Sheets

(51) Int. Cl.
*G01N 21/956* (2006.01)
*G01N 21/88* (2006.01)
*H04N 5/225* (2006.01)
*H04N 5/232* (2006.01)
*H04N 5/235* (2006.01)

(52) U.S. Cl.
CPC ............ *G06T 7/001* (2013.01); *G06T 7/0004* (2013.01); *G01N 2021/8825* (2013.01); *G01N 2021/8848* (2013.01); *G01N 2201/0683* (2013.01); *G06T 2207/10152* (2013.01); *G06T 2207/20212* (2013.01); *G06T 2207/30148* (2013.01); *H04N 5/2256* (2013.01); *H04N 5/2354* (2013.01); *H04N 5/23229* (2013.01)

(58) Field of Classification Search
CPC .... G01N 2021/8848; G01N 2201/0683; G06T 7/0004; G06T 7/001; G06T 2207/10152; G06T 2207/20212; G06T 2207/30148; H04N 5/2256; H04N 5/23229; H04N 5/2354
See application file for complete search history.

(56) References Cited

U.S. PATENT DOCUMENTS

| | | | | |
|---|---|---|---|---|
| 6,384,910 | B2 * | 5/2002 | Vaez-Iravani | G01J 3/44 356/237.2 |
| 6,538,730 | B2 * | 3/2003 | Vaez-Iravani | G01N 21/9501 356/237.2 |
| 6,556,294 | B2 * | 4/2003 | Karpol | G01N 21/4788 356/237.4 |
| 6,608,676 | B1 * | 8/2003 | Zhao | G01N 21/9501 250/559.27 |
| 6,628,381 | B1 * | 9/2003 | Komem | G01N 21/9501 356/237.4 |
| 6,862,096 | B2 * | 3/2005 | Vaez-Iravani | G01N 21/956 356/243.4 |
| 7,088,443 | B2 * | 8/2006 | Vaez-Iravani | G01N 21/47 250/559.4 |
| 7,110,106 | B2 * | 9/2006 | Xu | G01N 21/474 356/237.1 |
| 7,221,444 | B1 * | 5/2007 | Zhao | G01N 21/8806 356/237.1 |
| 7,315,363 | B2 * | 1/2008 | Hamamatsu | G01N 21/8806 356/237.2 |
| 7,369,233 | B2 * | 5/2008 | Nikoonahad | G01N 21/8806 356/237.2 |
| 7,414,715 | B2 * | 8/2008 | Wolters | G01N 21/47 356/213 |
| 7,471,382 | B2 * | 12/2008 | Miller | G01N 21/9501 356/237.4 |
| 7,554,655 | B2 * | 6/2009 | Fairley | G01N 21/8806 356/237.4 |
| 7,859,656 | B2 | 12/2010 | Uto | |
| 8,194,301 | B2 | 6/2012 | Zhao et al. | |
| 8,520,208 | B1 * | 8/2013 | Biellak | G01J 1/0422 356/237.2 |
| 8,634,069 | B2 * | 1/2014 | Nakano | G01N 21/9501 356/237.1 |
| 8,823,935 | B1 * | 9/2014 | Meeks | G01N 21/8806 356/237.4 |
| 8,891,079 | B2 * | 11/2014 | Zhao | G01N 21/9501 356/237.2 |
| 9,176,072 | B2 * | 11/2015 | Zhao | G01N 21/8806 |
| 9,194,811 | B1 * | 11/2015 | Zhao | G01N 21/9501 |
| 9,279,774 | B2 * | 3/2016 | Romanovsky | G01N 21/8851 |
| 9,291,575 | B2 * | 3/2016 | Zhao | G01N 21/9501 |
| 9,908,200 | B2 * | 3/2018 | Adams | B23K 26/0613 |
| 2008/0297786 | A1 * | 12/2008 | Fukushima | G01N 21/956 356/244 |
| 2012/0327415 | A1 | 12/2012 | Ito | |
| 2013/0016346 | A1 * | 1/2013 | Romanovsky | G01N 21/8851 356/237.5 |
| 2015/0103348 | A1 | 4/2015 | Zhao et al. | |

OTHER PUBLICATIONS

Zheng, Guoan, "Breakthroughs in Photonics 2013: Fourier Ptychographic Imaging", Zheng, G. (2014). Breakthroughs in Photonics 2013: Fourier Ptychographic Imaging. IEEE Photonics Society, 6(2), 1-8. doi:10.1109/JPHOT.2014.2308632, Apr. 2014, 8 pages.

* cited by examiner

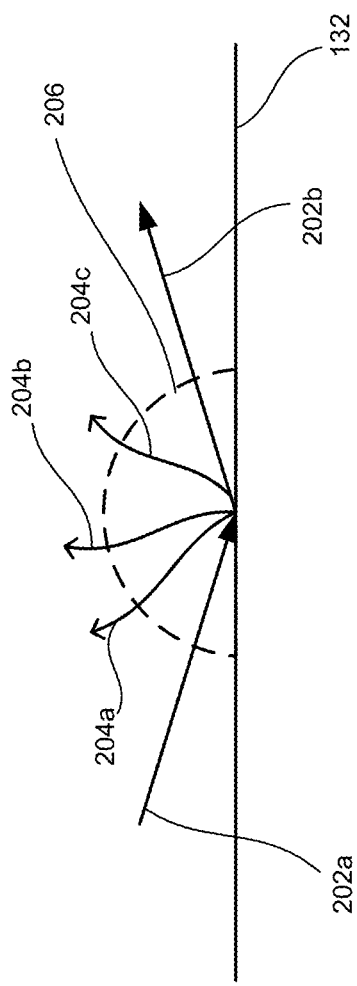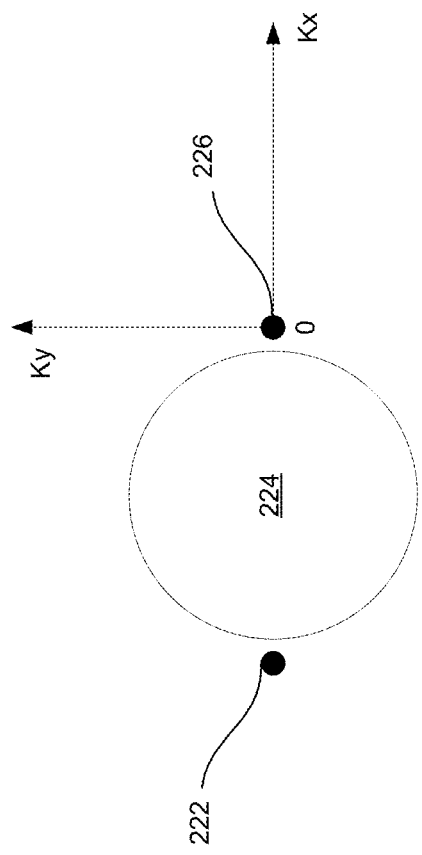

SIMULTANEOUS MULTI-DIRECTIONAL LASER WAFER INSPECTION

CROSS-REFERENCE TO RELATED APPLICATION

This application claims priority of U.S. Provisional Patent Application No. 62/395,086, entitled Simultaneous Multi-Directional Laser Wafer Inspection, filed 15 Sep. 2016 by Guoheng Zhao et al., application is incorporated herein by reference in its entirety for all purposes.

TECHNICAL FIELD OF THE INVENTION

The invention generally relates to the field of semiconductor inspection systems. More particularly the present invention relates to wafer inspection systems having darkfield modes using lasers as light sources.

BACKGROUND

Generally, the industry of semiconductor manufacturing involves highly complex techniques for fabricating integrating circuits using semiconductor materials which are layered and patterned onto a substrate, such as silicon. An integrated circuit is typically fabricated from a plurality of reticles. Generation of reticles and subsequent optical inspection of such reticles have become standard steps in the production of semiconductors. Initially, circuit designers provide circuit pattern data, which describes a particular integrated circuit (IC) design, to a reticle production system, or reticle writer.

Due to the large scale of circuit integration and the decreasing size of semiconductor devices, the reticles and fabricated devices have become increasingly sensitive to defects. That is, defects which cause faults in the device are becoming increasingly smaller. The device can generally be required to be fault free prior to shipment to the end users or customers. There are large varieties of defect types that generally can only be captured by specific inspection modes. For instance, conventional inspection systems often require multiple inspection passes to capture most defect types and can miss some defect types because of the lack of some inspection modes. Although various inspection systems and methods have been developed, there is a continuing need for improved inspection systems and methods.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, an apparatus for inspecting a sample is disclosed. The apparatus includes illumination optics for simultaneously directing a plurality of incident beams at a plurality of azimuth angles towards a sample and collection optics for directing a plurality of field portions of output light from at least two or more of the angles towards two or more corresponding sensors. The sensors are arranged to receive the field portions and generate corresponding images. The apparatus further comprises a processor for analyzing the images to detect defects on the sample. In one aspect, the images from the two or more angles are combined prior to analysis.

In a specific implementation, the incident beams simultaneously illuminate a plurality of different portions of the sample. In another aspect, the illumination optics are arranged to shape the incident beams to form a plurality of incident lines on the sample. In one example, the illumination optics are arranged to shape the incident beams to form a plurality of incident spots on the sample. In another embodiment, the illumination optics comprise a polarizer for each incident beam. In yet another aspect, the illumination optics comprise eight sets of illumination optics for directing eight incident beams at eight azimuth angles towards the sample. In an alternative example, the illumination optics are arranged to direct the incident beams in the form of a plurality of lines that have a 5:1 gap-to-line ratio.

In a specific embodiment, the field splitter comprises a prism. In another embodiment, the field splitter comprises relays and mirrors. In another aspect, the field splitter comprises a diffractive optical element. In another embodiment, the field portions that reach the sensors correspond to all of the azimuth angles. In another aspect, the field portions that reach the sensors have a number that is lower than a number of the azimuth angles. In yet another embodiment, there are eight or more azimuth angles and two to four field portions that reach the sensors. In a further aspect, the field splitter is configurable to split the field into different two to four field portions that correspond to different two to four ones of the angles.

In another example, the collection optics comprises individual Fourier filters that are individually configurable for each field portion. In another implementation, the collection optics comprises individual pupil filters that are individually configurable for each field portion. In another example, the collection optics comprises individual polarizer filters that are individually configurable for each field portion. In an alternative embodiment, analyzing the two or more images includes combining the images to cancel noise from such combined image. In yet another embodiment, the sample is a patterned wafer, and the illumination optics and the apparatus are configured to cause the incident beams at the plurality of angles to scan across a plurality of same swaths of the sample in a raster pattern. In this aspect, the field portions are aligned along the scan direction of each swath. In another aspect, the sample is a bare wafer, and the illumination optics and the apparatus are configured to cause the incident beams at the plurality of angles to scan across the sample in a spiral pattern. In this aspect, the field portions are not aligned in the scan direction. In another aspect, the incident beams have an oblique angle of incidence. In another aspect, the illumination optics and collection optics are configured for darkfield imaging. In a further aspect, the illumination optics and collection optics are further configured for brightfield imaging, and the sensors and collection optics are configured to have separate darkfield and bright field channels in addition to separate channels for receiving the field portions from different angles at each corresponding sensor.

These and other aspects of the invention are described further below with reference to the figures.

BRIEF DESCRIPTION OF THE DRAWINGS

FIGS. 2A through 2C illustrate how multiple azimuthal illumination angles can extend the coverage of collection in Fourier space by approximately 4× in area.

DETAILED DESCRIPTION OF EXAMPLE EMBODIMENTS

Figure 1A:
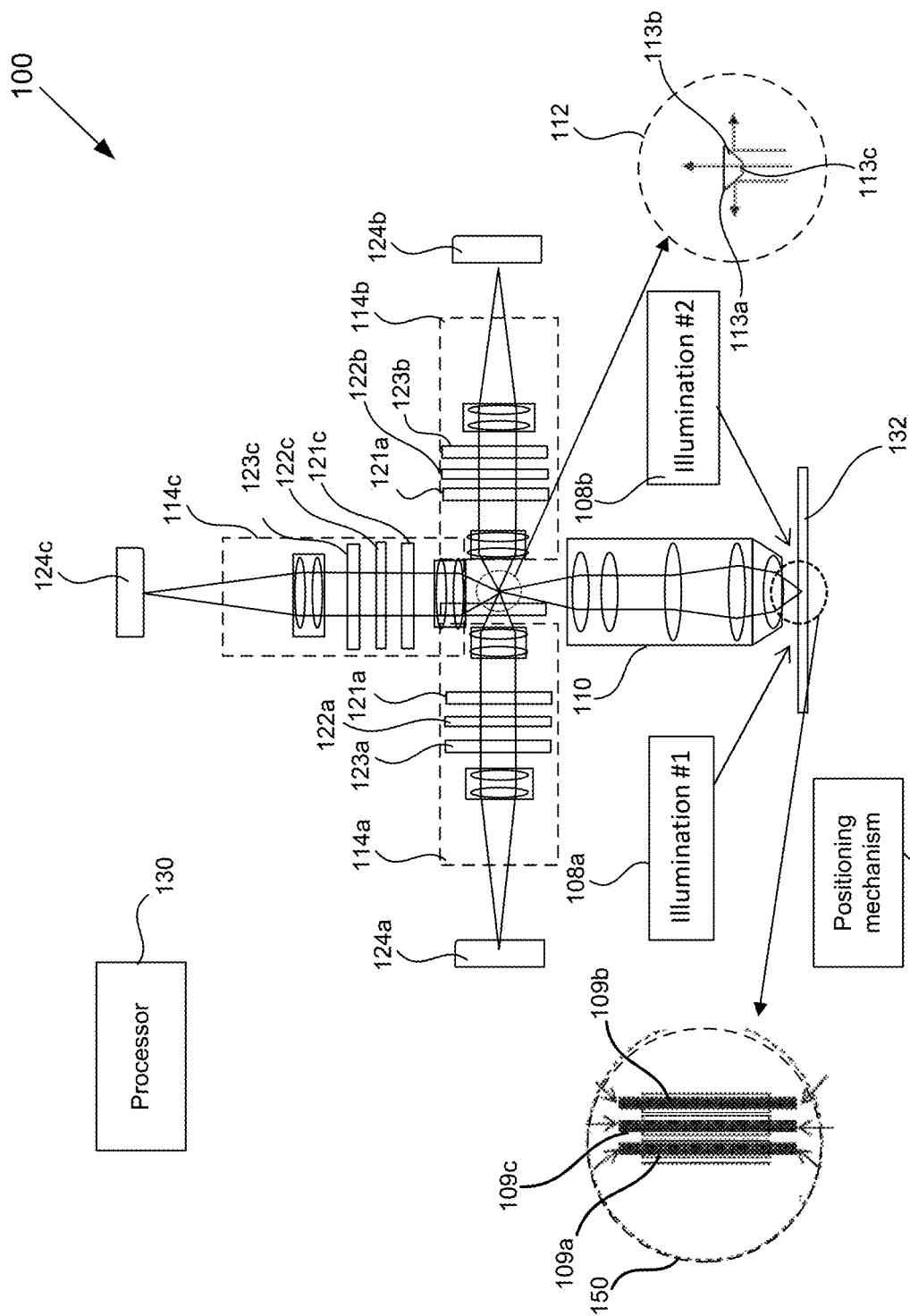
FIG. 1A is a diagrammatic representation of an inspection system that utilizes simultaneous multiple angles of incidence (AOI) illumination in accordance with a specific embodiment of the present invention.

In the following description, numerous specific details are set forth in order to provide a thorough understanding of the present invention. The present invention may be practiced without some or all of these specific details. In other instances, well known component or process operations have not been described in detail to not unnecessarily obscure the present invention. While the invention will be described in conjunction with the specific embodiments, it will be understood that it is not intended to limit the invention to the embodiments.

There are several types of inspection tools with various parameters that affect the accuracy and throughput of defect detection. One common type of inspection system utilizes a laser. The high brightness of lasers are currently the most efficient light sources for dark field wafer inspection. Wafer inspection tools from KLA-Tencor of Milpitas, Calif., such as the SP series and AIT series, which are based on laser spot scan imaging, and the PUMA series, which is based on laser line scan imaging, have been widely used in semiconductor industry. One limitation of some inspection systems is that illumination is either single direction, or too few directions and not independent, configurations. Even when there are multiple illumination angles, wafers were inspected sequentially at different illumination angles, therefore, reducing the inspection throughput. Wafer inspection systems that use multiple azimuthal direction illumination can effectively be used to inspect different types of defects, and the combination of all illumination directions can improve the effective optical resolution and enhance defect sensitivity. However, these systems tend to use either a single pass, which is not optimum for some defect types, or sequential passes that significantly reduce inspection speed.

Certain embodiments of the present invention provide an inspection system that utilizes simultaneous multiple illumination channels to generate a plurality of incident beams at different azimuth angles with corresponding separated collection channels for simultaneously directing the output light from the different angles to separate detectors. Although the following example system implementations illustrate a particular number of illumination and detection channels, such as three, any suitable number of channels may be used.

FIG. 1 is a diagrammatic representation of an inspection system 100 that utilizes simultaneous multiple illumination angles in accordance with a specific embodiment of the present invention. This inspection system is a darkfield inspection system although other illumination modes may be integrated within such system as described further below.

Each of the incident beams is generated at a different azimuth angle that illuminates a different portion of the optical field of the objective. That is, the incident beams simultaneously illuminate different portions of the sample. In the illustrated example, the system 100 includes three sets of illumination optics although only illumination optics 108a and 108b can be seen from this perspective. These three illumination optics are arranged to generate and direct three incident beams at three different angles towards sample 132. As shown in enlarged scan area 150, these three incident beams are shaped to form lines 109a, 109b, and 109c. In this embodiment, the different illumination optics are arranged and configured at different angles and positions to result in three spatially separated illumination lines.

Figure 1B:
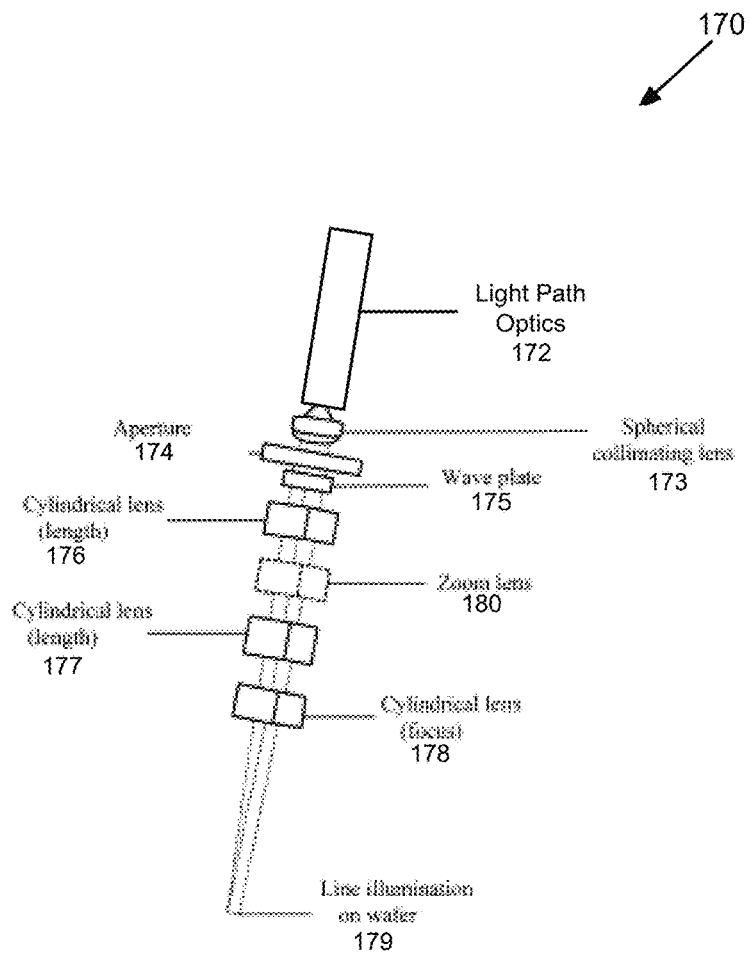
FIG. 1B illustrates exemplary illumination optics for providing an illuminated field line.

In one example, each illumination beam may be formed into a narrow long line by any suitable optics, such as anamorphic optics, including cylindrical lens or mirrors to illuminate only a narrow strip of the optical field of view. Various embodiments for producing a narrow illumination line at various angles are further described in U.S. Pat. No. 9,176,072, which is incorporated herein by reference in its entirety. FIG. 1B illustrates exemplary illumination optics 170 that use three cylindrical lenses for providing adjustable illumination line lengths in accordance with one embodiment of the present invention. Of course, a single fixed length may be employed in alternative embodiments. In one system example, illumination optics 170 corresponds to each set of illumination optics at each azimuth angle (e.g., 108a and 108b of FIG. 1A).

In this embodiment, the illumination optics 170 can include any suitable light optics for providing the initial illumination. For instance, a single light source (not shown), such as a laser, for providing illumination to all illumination channels can be used to generate light, and then any suitable light path optics 172, such as an optical fiber and/or any suitable mirrors, may be used to direct the light towards each channel. In alternative embodiments, multiple light sources—one for each illumination channel—may be implemented. In the illustrated example, the light directed by light path optics 172 can be collimated by a spherical collimating lens 173, and shaped by an aperture 174. The orientation of polarization may be controlled by a wave plate 175 or any other suitable polarizer component.

At this point, the illumination light can be formed into a line 179 by at least two of cylindrical lenses 176, 177, and 178. In this embodiment, cylindrical lenses 176 and 177 can be used to determine line length, whereas cylindrical lens 178 can be used to focus the line (e.g., determine its width). In an actual implementation, a motor (e.g., positioning mechanism 131 of FIG. 1A) can be used to exchange and move cylindrical lens 177, thereby, providing alternate line lengths for throughput and sensitivity adjustments. In another implementation, cylindrical lenses 176 and 177 can be replaced by a continuous zoom lens 180 that allows selection of a specific illumination line length within a predetermined range.

Figure 1C:
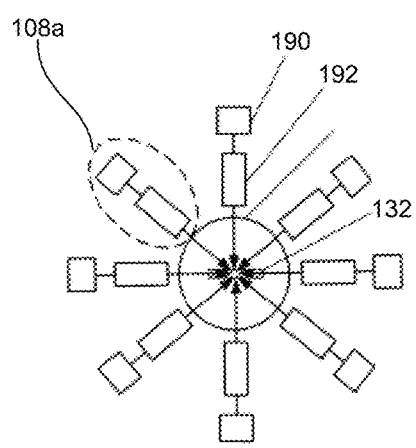
FIG. 1C illustrates eight sets of illumination optics at eight different angles in accordance with a specific implementation of the present invention.

In one embodiment, eight illumination azimuthal angles, which are about 45° apart, may be used. FIG. 1C illustrates a top view of eight sets of illumination optics (e.g., 108*a*) at eight different angles in accordance with a specific implementation of the present invention. As shown, each set of illumination optics may comprise beam shaping optics (e.g., 190) and polarization control optics (e.g., 192) for together directing and shaping, polarizing, and directing the incident beam towards the sample 131.

In other embodiments, a single light source can generate a light beam, which is then divided into multiple light sources that are fed into different illumination optics at different angles. That is, the multiple illumination beams can be either generated by a single laser or by multiple lasers. Other suitable light sources may include lamps, laser pumped plasma light source, x-ray, and EUV light sources, etc. Additionally, the illumination optics may include any suitable type of elements for conditioning each illumination beam, including setting aperture and field stop locations and sizes, conditioning the illumination beam for a polarizer, manipulating the beam profile, collimating, converging, expanding, reducing, etc. Additionally, any suitable wavelengths may be utilized in the systems of the present invention.

For a current typical high numerical aperture (NA) objective lens with an optical field of view of around 0.5 mm to 1 mm, each illumination line width can be around 10 um wide using fairly low NA optics (<0.05 for DUV wavelengths). A 5:1 gap-to-linewidth ratio may also be used, and this ratio is more than sufficient to avoid cross talks between illumination angles. In one example, a 0.5 mm field of view can accommodate up to 10 illumination fields. For some illumination directions, the oblique elongation factor expands the line width and, accordingly, require a larger portion of the optical field so that a lower number of fields are used. Since the illumination field is separated into individual field portions with gaps there between, there will be negligible cross talk between the illumination beams and long coherent length lasers can also be used.

Referring back to FIG. 1A, the objective lens 110 forms a first intermediate real image of the illumination field from the scattered and reflected output light, which is in response to the incident beams hitting the sample 132. The system may use an objective lens that is a single assembly of a finite conjugate imaging lens or a two-piece infinity corrected pair.

The intermediate field may then be split into two or more portions by a field splitter. Each portion is then relayed through different collection channels (e.g., 114*a*, 114*b*, and 114*c*) onto different sensors, such as sensors 124*a*, 124*b*, and 124*c*. For example, the sensors can include one or more of the following: charge coupled devices (CCD), CCD arrays, time delay integration (TDI) sensors, TDI sensor arrays, photomultiplier tubes (PMT) arrays, avalanche photodiode arrays, and/or other sensors.

The splitting of the intermediate field may be accomplished by any suitable optics component. As shown in enlarged area 112, the system 100 includes a prism, which serves as a field splitter that splits the intermediate field into three portions. This prism has two sides 113*a* and 113*b*, which each has a reflective coating and is positioned to reflect two different output beam field portions. This prism also has a third side 113*c* that is transparent and positioned to transmit a third output beam field portion. Other arrangements for splitting the field are further described below. The system may include additional prisms for splitting the field into additional fields that correspond to additional angles.

In certain cases in which eight parallel channels may not be cost effective, the number of split image fields in the collection side can be less than the number of illumination channels. For example, there can be 4 or less split fields, and any of 4 out of the 8 illumination angles can be configured to be parallel channels during recipe setup. Similarly, the system can be configured to have 2 or 3 parallel channels of split fields to achieve a lower cost system (e.g., system 100 of FIG. 1A). When the parallel collection channel have a count that is lower than the number of illumination angles, the field splitter can be repositioned so as to split the intermediate field into different field portions that correspond to selectable angles. Alternatively, the illumination beams can be steered with a mirror or a beam shifter to selectively illuminate the fields that are imaged onto the collection channels.

Figure 2C:
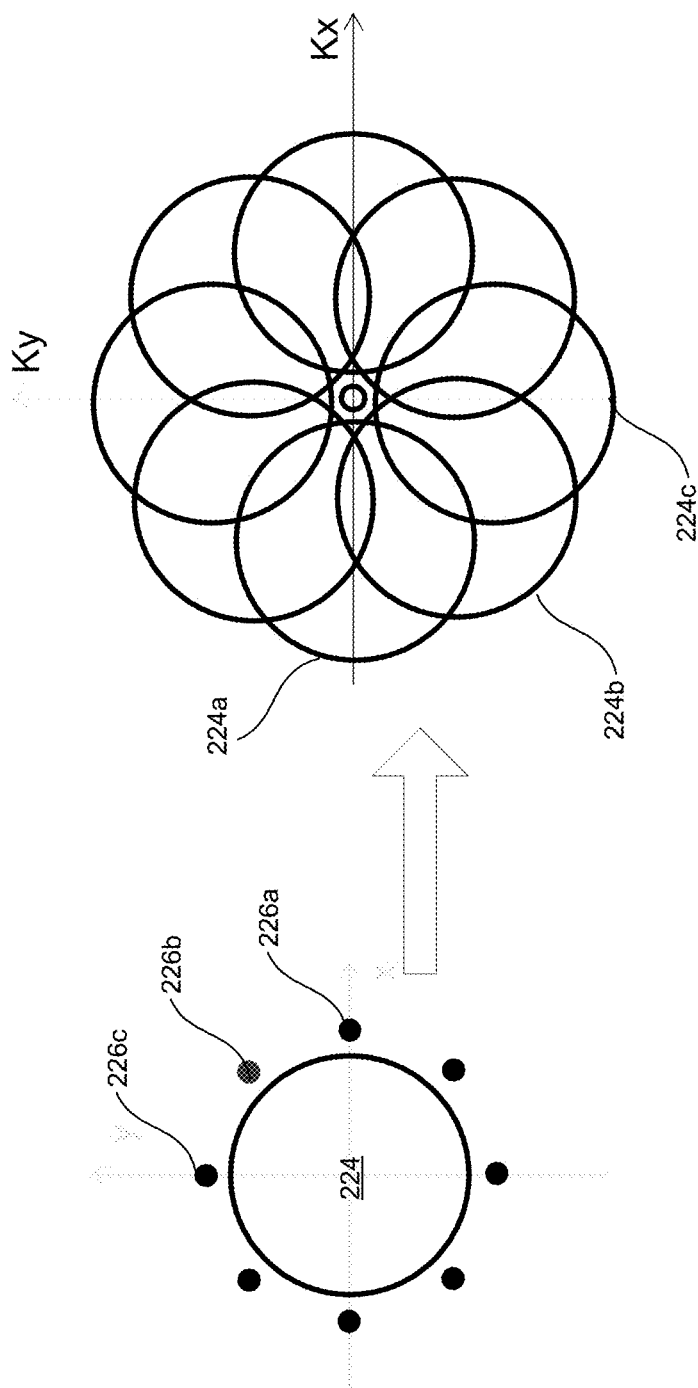

Using multiple azimuthal illumination angles can generally extend the coverage of collection in Fourier space by approximately 4× in area, as illustrated in FIGS. 2A through 2C. FIG. 2A is a side view of a single incident beam 202*a* hitting the sample 132 from one azimuth angle, which results in reflected specular beam 202*b* and scattered light (e.g., 204*a*, 204*b*, 204*c*) from dome region 206. FIG. 2B illustrates a top view of a collection pupil 224 relative to an incident beam 222 and its specular beam 226, which is also shown as shifted to be aligned with zero in Fourier space (e.g., in spatial wavenumber Kx and Ky coordinate system).

FIG. 2C illustrates the pupil collection space 224 relative to a ring of eight specular beams (e.g., 226*a*, 226*b*, and 226*c*) and their transformation into Fourier space. As shown, the specular beams are shifted to the origin of the Fourier space, along with the relative shifting of their corresponding collection pupil. For instance, specular beam 226*a* corresponds to transformed pupil 224*a*; specular beam 226*b* corresponds to pupil 224*b*; and specular beam 226*c* corresponds to pupil 224*c*. The combined coverage of all 8 transformed pupils is about 4× as large as the pupil of a single illumination beam, for example, 224*a*.

The additional collection coverage of Fourier space can be used in different ways to enhance defect sensitivity or to detect more defect types. In any of the embodiments described herein, each relay lens may be arranged to have an accessible Fourier pupil in which a Fourier filter and/or polarizer filter and/or phase plate and/or phase retardation plate and/or spatial filters can be placed and configured to various settings that for each channel. For example as shown in FIG. 1A, Fourier filters 122*a*, 122*b*, and 122*c* may be positioned within relay optics 114*a*, 114*b*, and 114*c*, respectively. Similarly, polarization filters 123*a*, 123*b*, and 123*c* may be positioned within relay optics 114*a*, 114*b*, and 114*c*, respectively. Spatial filters 121*a*, 121*b*, and 121*c* may also be positioned within relay optics 114*a*, 114*b*, and 114*c*, respectively.

Said in another way, each channel can have its own configurable or optimized Fourier filter, pupil mask, and polarization. The Fourier filters and polarization filters of the different channels can be configured independently, which allows independent optimization of each channel to further enhance defect sensitivity for specific defect types. Using multiple channels at different illumination angles simultaneously allows both defect sensitivity and defect types to be optimized without impacting inspection throughput.

While each channel can be processed separately to capture different types of defects that have higher sensitivity in some channels than other channels, all channels can also be combined based on Fourier Ptychographic imaging theory to provide a higher resolution image and, therefore, to improve the fidelity of wafer patterns and to improve the sensitivity of the defects that have more or less equal response in all channels. Several Ptychographic imaging approaches are further described in the paper *Breakthroughs in Photonics 2013: Fourier Ptychographic Imaging*, by Guoan Zheng, IEEE Photonics Journal, Vol. 6, April 2014, which paper is incorporated herein by reference in its entirety. This Fourier Ptychographic (FP) approach extends the concept of synthetic aperture imaging for non-interferometry setups by iteratively stitching together many variably illuminated, low-resolution intensity images in the Fourier space to expand the frequency passband and recover a high-resolution complex sample image. Instead of directly measuring the phase information of the incoming light field, FP uses an iterative phase retrieval process to recover the complex phase information of the sample. It has been shown that, without involving any interferometry measurement and mechanical scanning, FP facilitates microscopic imaging well beyond the cutoff frequency set by the NA of the objective lens.

At each illumination angle, a low-resolution intensity image of the sample is recorded. Under the thin-sample assumption, each acquired image uniquely maps to a different passband of the sample's spectrum. The FP algorithm then recovers a high-resolution complex sample image by alternatively constraining its amplitude to match the acquired low-resolution image sequence, and its spectrum to match the panning Fourier constraint. Essentially, FP introduces angular diversity functions to recover the high-resolution complex sample image, as compared to the translational diversity functions used in the conventional ptychography approach.

The reconstruction FP procedures may start with a high-resolution spectrum estimate of the sample: $\hat{U}_0(k_x, k_y)$ that corresponds to the expanded pupil area covered by all illumination angles This sample spectrum estimate may then be sequentially updated with the low-resolution intensity measurements $I_{mi}$ (subscript "m" pertaining to the measurement and "i" is the $i^{th}$ low-resolution image from the ith illumination angle). For each update step, a small sub-region of the $\hat{U}_0(k_x, k_y)$ corresponding to the spatial frequency range covered by the objective lens pupil for one illumination angle, and a Fourier transformation is applied to generate a new low-resolution target image $\sqrt{I_{li}}e^{i\varphi_{li}}$ ("l" represents low-resolution and "i" represents the $i_{th}$ angle). The sub-region spectrum's amplitude component $\sqrt{I_{li}}$ may then be replaced with the square root of the measurement $\sqrt{I_{mi}}$ to form an updated, low-resolution target image $\sqrt{I_{mi}}e^{i\varphi_{li}}$. This image may then be used to update its corresponding sub-region of $\hat{U}_0(k_x, k_y)$. The replace-and-update sequence may be repeated for all intensity measurements, and the above process several times can be iteratively repeated until a solution convergence, at which point $\hat{U}_0(k_x, k_y)$ is transformed to the spatial domain to produce a high-resolution complex sample image. The achievable resolution of the final FP reconstruction may then determined by the latest angle. As such, FP is able to bypass the design conflicts of conventional microscopes to achieve high-resolution, wide field-of view imaging capabilities.

Figure 3:
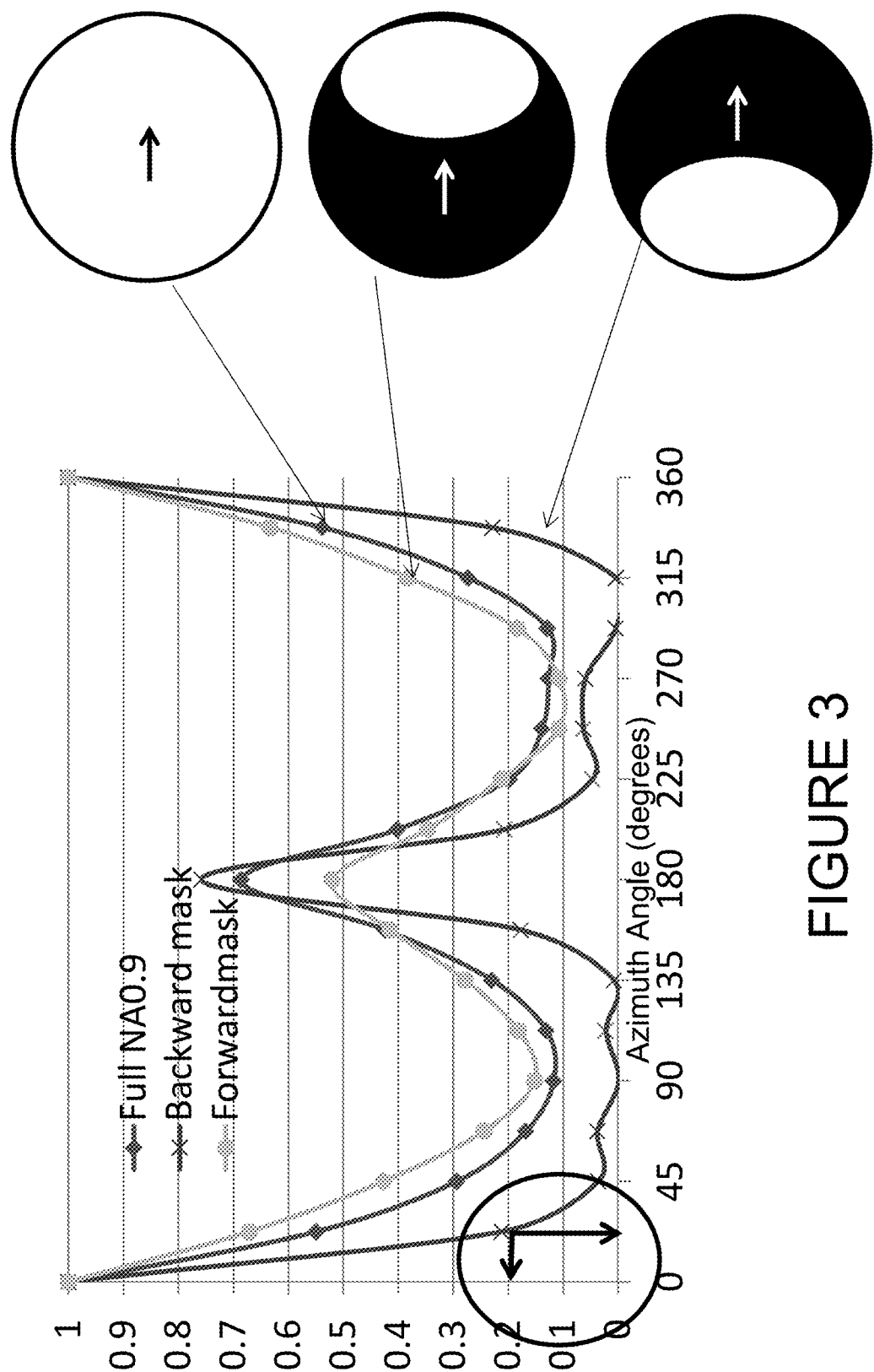
FIG. 3 is a graph of the speckle correlation of a reference zero angle illumination with respect to other angles of illumination, as well as three different aperture settings: full, backward, and forward masks.

The optics configuration embodiments described above can work for both patterned wafer inspection and bare wafer inspection, but the split field arrangement may be optimized differently. For both patterned and bare wafer inspections, the speckle noise of different illumination angles can be partially uncorrelated as shown in FIG. 3, which is a graph of the speckle correlation of a reference zero angle illumination with respect to other angles of illumination, as well as three different aperture settings: full, backward, and forward masks. As shown, the highest speckle correlation has a value of 1 for correlation to the same 0 angle illumination. A speckle correlation value of 0 means there is zero speckle noise correlation between the noise of the 0 angle and other angle illumination images. Additionally, different collection masks may achieve different speckle correlations results as shown for the backward mask (which is placed behind the specular beam's output position in the pupil, which has lower correlation values than forward or full apertures.

Speckle correlation can be used to combine images of the different angles to average out a significant portion of noise from such images. For instance, the images can be averaged, summed/subtracted, multiplied, or some other combination for cancelling/minimizing noise from the combined image. Combining multiple channels can significantly reduce speckle noise and improve particle detection sensitivity. If a set of different angle images have zero speckle correlation, for example, averaging results in the noise being reduced by $\sqrt{2}$. On the other hand, images that are highly correlated, such as a correlation of 1, will result in their noise presence being duplicated during the averaging process. In this example, a backward collection mask results in less noise in a combined image for most angles. For the defects that have similar responses for different illumination angles, such as small particles on bare wafers, combining multiple channels of parallel inspection can still improve sensitivity by reducing speckle noise. However, this may not be the case for other types of defects or structures, which may show largely different responses for different angles or show different minimum correlation values for different collection masks and angles.

In one embodiment, each collection channel may include a matched filter that is implemented in digital image processing (e.g., performed by the imaging sensor followed by a processor 130) to further reduce the speckle noise and, thus, improve SNR. For example, a simple digital image processing filter having the same shape as the defect image (donut shaped for particles) can be used, while other types of filters may be used in other embodiments. Note that a matched filter is applicable to P (parallel to incident plane) polarization illumination, not S (perpendicular to incident plane) polarization illumination. Although P polarization illumination has much stronger scattering than S polarization illumination, P polarization can provide optimal sensitivity on wafers with low haze, such as polished Si (silicon) wafer and some smooth polysilicon wafers.

In one embodiment, the SNR can be further enhanced with a radial polarizer in the imaging path between the objective lens and each imaging sensor such that the polarization is aligned with the radial direction. This radial polarizer can reduce the wafer surface scattering while passing most of the scattered light from small particles. Various combinations of illumination polarization and imaging polarization can be used for specific defect types. For example, the polarizations of illumination beams can be aligned to be in the same direction, either parallel to x or y, and a linear polarizer can be used in the collection path, either parallel to or perpendicular to the illumination polarization. These configurations can be advantageous for patterned wafer inspection where pattern features tend to be aligned with x and y directions. Notably, the separate lasers allow radial or tangential polarizations of illumination that otherwise would not be possible with a single point light source.

Figure 4:
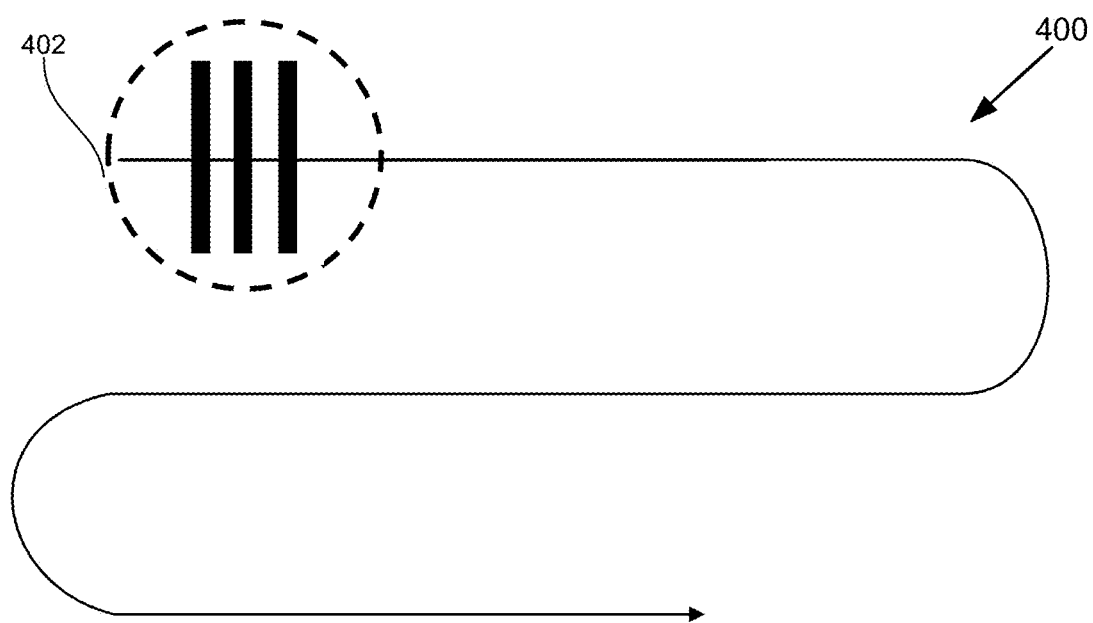
FIG. 4 is a diagrammatic top view of wafer inspection that uses an XY stage and scan path to form a raster scan pattern.

The inspection system may implement any suitable scan pattern for inspecting the sample. Patterned wafer inspection typically use an XY stage and scan path to form a raster scan pattern 400 as shown in FIG. 4. In this example, the illumination field is split along the scan direction into three scan lines 402. Each line at its specific illumination angle is scanned along the same swath. There is a small offset between adjacent scan lines that is a small fraction of the optical field size, which only increases the scan length slightly and, therefore, has no practical impact on inspection throughput.

Regardless of the arrangement of the illumination scan portions, there will be a gap between the scan portions that may leave portions of the sample unscanned, depending on the particular scan pattern. In the previous example of FIG. 4, each illumination beam scans the same wafer swath and the entire wafer can be easily scanned by all the beams using a raster pattern. However, if the scan lines of FIG. 4 were offset in the vertical direction from each other, the scan pattern may include consecutively retracing the same swath with each of the incident beams.

Figure 5:
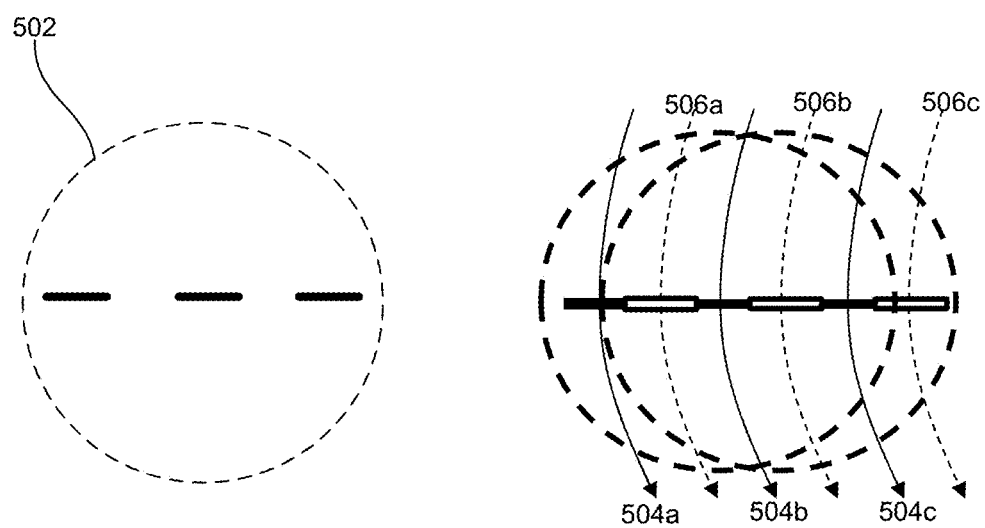
FIG. 5 illustrates a radially split illumination field and spiral inspection scan pattern in accordance with another embodiment of the present invention.

Bare wafer inspection tends to use spindle stages, and the scan path is r-theta spiral, instead of xy raster. If the field is split as shown in FIGS. 1A and 4, it would be difficult to properly scan the area near the center of the wafer. For instance, some of the beam lines will likely miss the center portion of the wafer. The spiral pattern may include starting the scan on the outside of the wafer and moving to the inside or visa versa. The acceleration along the inside may have to be changed relative to the outside. The beam line offset of FIGS. 1A and 4 would be in the tangential direction and would likely result in blurring at the sensor, e.g., TDI integration blur. To minimize blur, the field can be split in a different configuration to allow better scan coverages. When fields that are adjacent to each other and are split, it may cause some small portion of the two ends of each field to get missed and/or introduce some degree of cross-talk. For instance, the field may be split in a radial direction as shown by scan line arrangement 502 of FIG. 5. In this embodiment, the field portions are not aligned in the scan direction, and next scans can be configured to fill in between previous scan portions. As shown, a first pass results in the three beam lines being scanned along paths 504a, 504b, and 504c. In a second pass, the three beam lines are scanned along paths 506a, 506b, and 506c to fill in the unscanned sample portions of the previous scan.

In general, the gaps between scan lines/spots eliminate cross-talk at the sensor plane, and the lines/spots and scan pattern can be configured such that these gaps are covered by subsequent scans. Several example techniques for interleaved scan areas are further described in U.S. Pat. No. 8,194,301, which patent is incorporated herein by reference in its entirety.

Certain embodiments of the present invention provide a plurality of simultaneous illumination angles with simultaneous and independent collection to enhance defect sensitivity, which can be angle-dependent. For instance, it has been found that certain types of defects and patterns can be imaged with better contrast and resolution at certain illumination angles or combinations of angles. That is, a same pattern will image differently at different angles and the same defect can have very different signal to noise ratio at different illumination angles. If images are combined from a plurality of angles, the image will tend to look more similar to the real structure. These high resolution images that are closer to the real structure can then be more easily classified into different defect types, such as being near a particular structure type (corner vs. line), missing material type defect, additional material defect, etc. For patterned wafer inspections, defect sensitivity can be strongly dependent on illumination direction, as found by both experimental and simulation data. Simultaneous multi-directional illumination can significantly improve defect sensitivity and detection of different defect types, especially for asymmetric defects, which are present in a large portion of the patterned defects.

Various mechanisms and techniques may be used to image the response from split illumination fields at different angles, besides the one described above. For instance, various combinations of diffractive optical elements, prisms, relays and/or masked mirrors may be utilized to direct output light from different angles towards different sensors.

Figure 6:
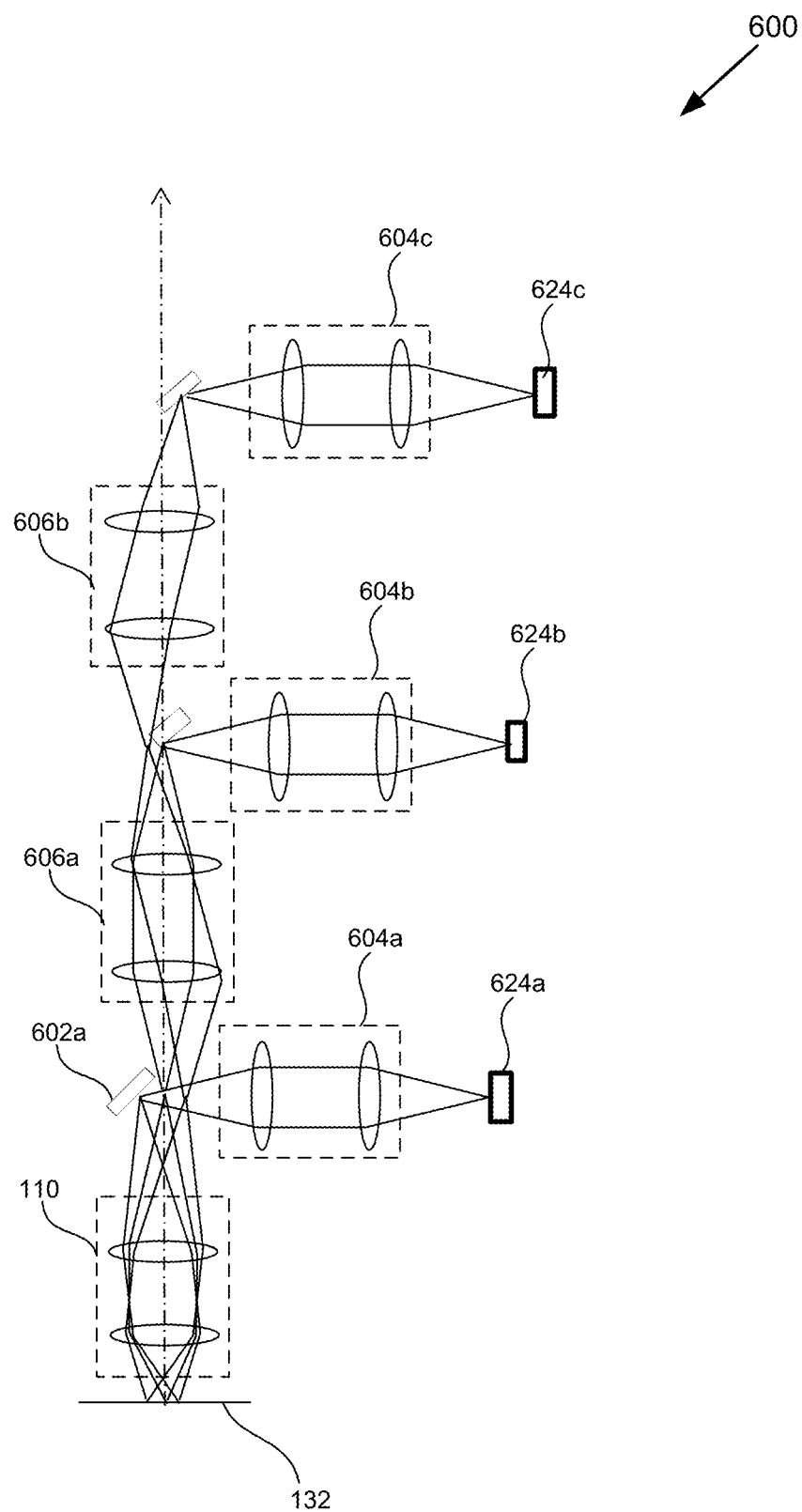
FIG. 6 is a diagrammatic representation of an imaging system in accordance with an alternative of the present invention.

FIG. 6 is a diagrammatic representation of an imaging system 600 in accordance with an alternative of the present invention. As shown, output light from the different scan areas is directed through objective 110. The system 600 may also include a plurality of mirrors (e.g., 602a, 602b, and 602c) and relays (e.g., 606a and 606b) that are positioned to receive and direct output light from different angles or scan portions towards different sensors (e.g., 624a, 624b, and 624c). For instance, first mirror 602a reflects output light from a first angle. Likewise, relay 606a relays output light from a second angle towards a second mirror 602b, which reflects the output light from the second angle. Relay 606b relays output light from a third angle towards third mirror 602c, which reflects this output light from the third angle. Relay optics (e.g., 604a, 604b, and 604c) are then positioned to relay output light from individual angles towards individual sensors (e.g., 624a, 624b, and 624c, respectively).

Figure 7:
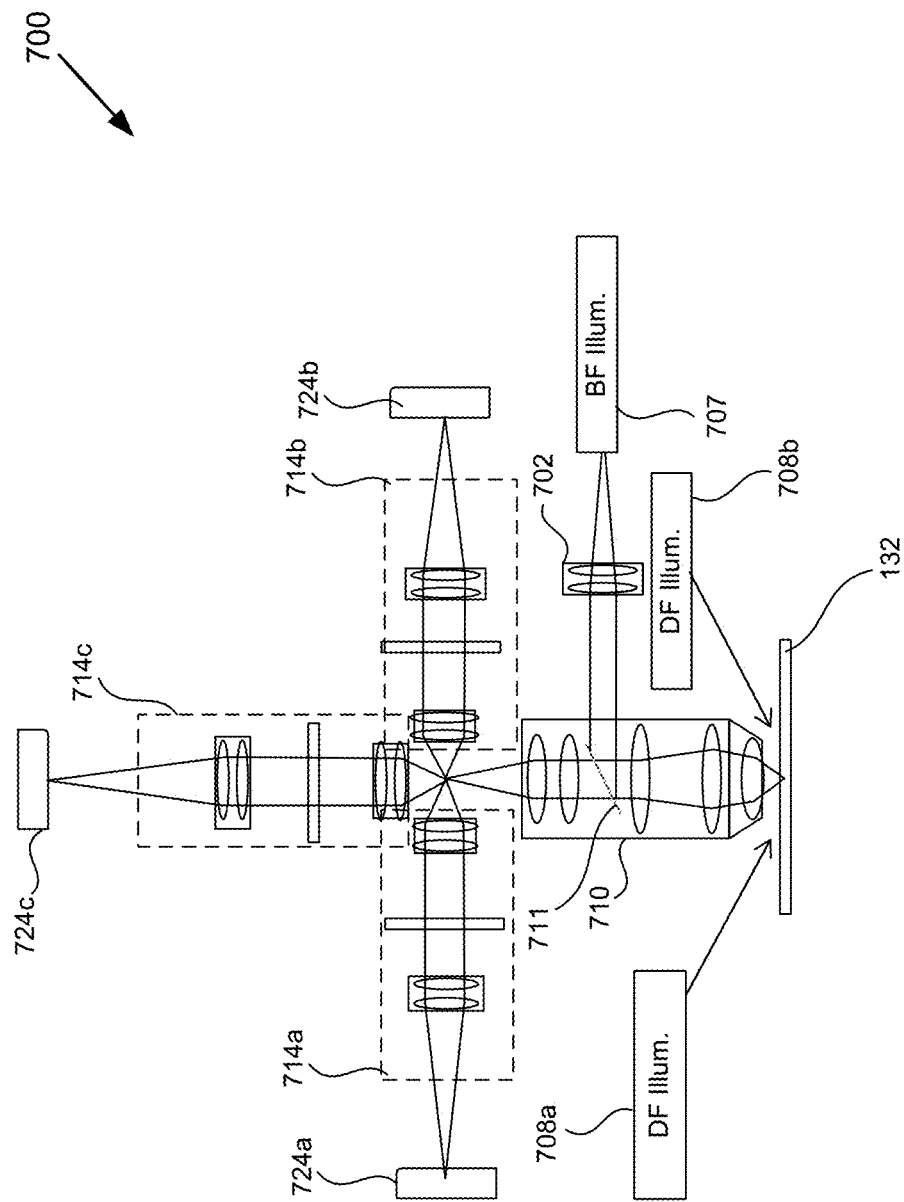
FIG. 7 is a diagrammatic representation of an inspection system that uses split field illumination for simultaneous multiple angles and both brightfield and darkfield imaging in accordance with another embodiment of the present invention.

In other example systems, the split illumination fields may also be used to accommodate both brightfield and darkfield illumination modes. FIG. 7 is a diagrammatic representation of an inspection system 700 that uses split field illumination for simultaneous multiple angles and both brightfield and darkfield imaging in accordance with another embodiment of the present invention. In general, one of the channels can be configured for bright field, and bright field and dark field images can be acquired simultaneously. As shown, the system 700 may include a brightfield illumination source 707, in addition to any suitable number of darkfield light illumination systems, such as 708a and 708b, which are arranged to provide different illumination angles as described above. In one example, the bright field light is shaped by illumination optics 702, reflected by mirror 711, and focused by objective 710 towards the sample 132.

The system also includes separate collection optics 714a and 714c for directing scattered and reflected light at different angles towards individual darkfield sensors 724a and 724c, respectively. Additionally, reflected light is directed toward sensor 724b via collection optics 714b.

Dark field images of different illumination angles can be combined to form an image that resembles the incoherent dark field image that preserves pattern fidelity. The full featured pattern may be obtained by combining 8 azimuthal illumination angles, which can be useful for pattern recognition and defect classification. Traditional laser dark field images often do not have enough features for defect classification or recipe setup defining care areas.

Laser light sources may be preferred because of the narrow bandwidth, which generally simplifies the lens design and manufacturing, and speckle busting components (such as rotating diffusers or fiber bundles) may also be used if such laser light source is used for bright field illumination. The stray light caused by the bright field illumination which goes through the imaging objective can be minimized by using slit apertures at intermediate field positions of dark field channels.

The systems described above may also include a controller (e.g., 130 of FIG. 1A), which comprises any suitable combination of software and hardware and is generally configured to control various components of the inspection system. For instance, the controller may control selective activation of illumination sources, illumination polarizer and compensator settings, Fourier filter settings, pupil filter setting, polarizer settings, collection angle selection, the detection compensator and analyzer settings, illumination aperture/shutter settings, etc. The controller 130 may also receive signal or image data generated by each sensor and be configured to analyze the resulting signal or image or to determine whether defects are present on the sample or characterize defects present on the sample.

The systems described herein may also include a positioning mechanism (e.g., 131 of FIG. 1A) for rotation, tilt, and/or translation movement of various movable components (such as the sample stage, fixed apertures/masks, shutters, polarizer, collection channel optics, field splitters, analyzer, compensator, etc.) to different positions. By way of examples, the positioning mechanism 131 may include one or more motor mechanisms, such as a screw drive and stepper motor, linear drive with feedback position, band actuator and stepper motor, etc.

Each controller described herein may be configured (e.g., with programming instructions) to provide a user interface (e.g., on a computer screen) for displaying resultant images and other sample characteristics. The controller may also include one or more input devices (e.g., a keyboard, mouse, joystick) for providing user recipe input, such as selecting wavelength ranges, AOI (angles of incidence)/azimuth angles, polarization states of incident light or collected light, as well as detection parameters. The controller typically has one or more processors coupled to input/output ports and one or more memories via appropriate buses or other communication mechanisms.

Because such information and program instructions may be implemented on a specially configured computer system, such a system includes program instructions/computer code for performing various operations described herein that can be stored on a computer readable media. Examples of computer readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
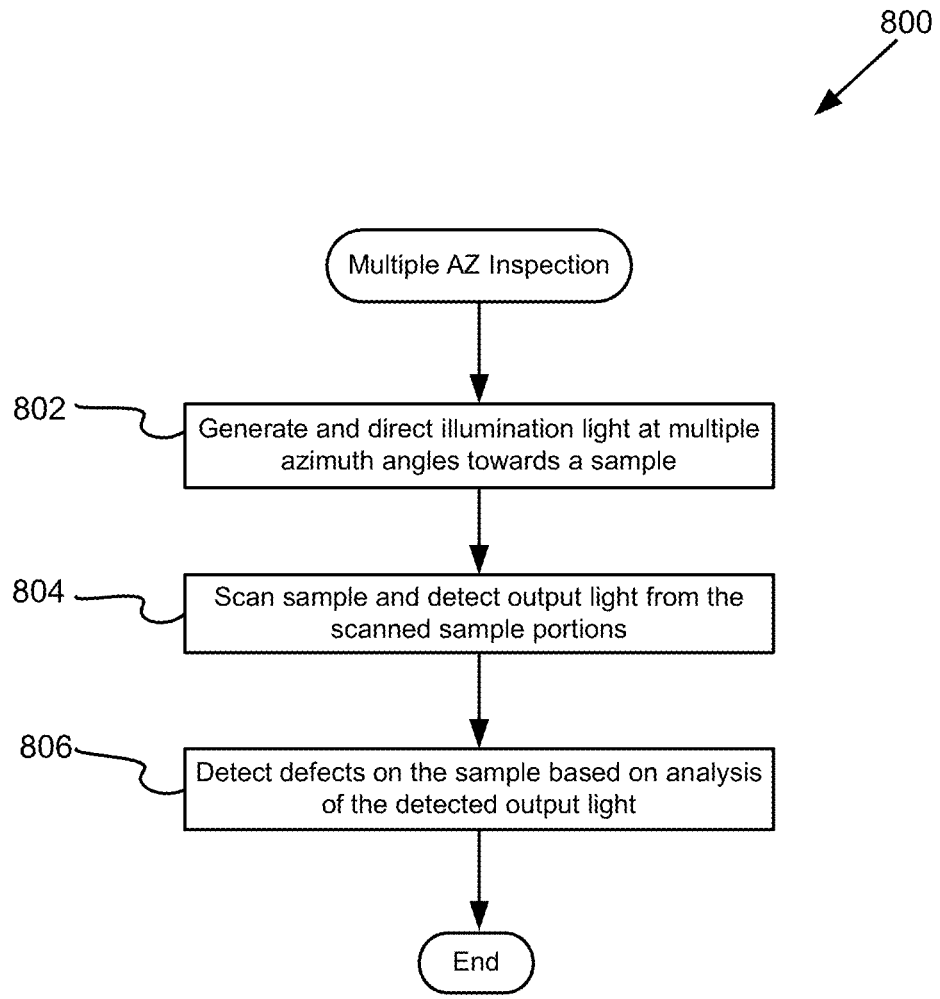
FIG. 8 is a flow chart illustrating an inspection procedure 800 in accordance with one embodiment of the present invention.

Any suitable inspection processes may be implemented with the systems described herein. FIG. 8 is a flow chart illustrating an inspection procedure 800 in accordance with one embodiment of the present invention. Initially, illumination light at multiple azimuth angles may be generated and directed towards a sample in operation 802. The sample may then be scanned with the illumination beams in operation 804. Additionally, output light from two or more of the scanned portions at different angles may also be detected in operation 804. Defects may then be detected based on analysis of the detected output light in operation 806. By way of example, various die-to-die, cell-to-cell, or die-to-database inspection processing techniques may be implemented on the detected multiple angle images, separately or combined.

Although the foregoing invention has been described in some detail for purposes of clarity of understanding, it will be apparent that certain changes and modifications may be practiced within the scope of the appended claims. It should be noted that there are many alternative ways of implementing the processes, systems, and apparatus of the present invention For example, although system embodiments are described herein as being applicable to inspection of semiconductor devices, it is contemplated that such system may possible be used for other types of applications, such as inspection of other types of samples or defect inspection. Accordingly, the present embodiments are to be considered as illustrative and not restrictive, and the invention is not to be limited to the details given herein.

What is claimed is:

1. An apparatus for inspecting a semiconductor sample, comprising:
   illumination optics for simultaneously directing a plurality of incident beams at a plurality of azimuth angles towards a sample;
   collection optics for directing a plurality of field portions of scattered output light from two or more of the plurality of angles towards two or more corresponding sensors, wherein the collection optics comprise a field splitter for splitting an intermediate field of the output light into the plurality of field portions;
   the two or more sensors for receiving the field portions corresponding to two or more angles and generating two or more corresponding images; and
   a processor for analyzing the two or more images to detect defects on the sample, wherein analyzing the two or more images includes combining the images to cancel noise from such combined image.

2. The apparatus of claim 1, wherein the incident beams simultaneously illuminate a plurality of different portions of the sample.

3. The apparatus of claim 1, wherein the illumination optics are arranged to shape the incident beams to form a plurality of incident lines on the sample.

4. The apparatus of claim 1, wherein the illumination optics are arranged to shape the incident beams to form a plurality of incident spots on the sample.

5. The apparatus of claim 1, wherein the illumination optics comprise a polarizer for each incident beam.

6. The apparatus of claim 1, wherein the illumination optics comprise eight sets of illumination optics for directing eight incident beams at eight azimuth angles towards the sample.

7. The apparatus of claim 1, wherein the illumination optics are arranged to direct the incident beams in the form of a plurality of lines that have a 5:1 gap-to-line ratio.

8. The apparatus of claim 1, wherein the field splitter comprises a prism.

9. The apparatus of claim 1, wherein the field splitter comprises a plurality of relays and mirrors.

10. The apparatus of claim 1, wherein the field splitter comprises a diffractive optical element.

11. The apparatus of claim 1, wherein the field portions that reach the sensors correspond to all of the azimuth angles.

12. The apparatus of claim 1, wherein the field portions that reach the sensors have a number that is lower than a number of the azimuth angles.

13. An apparatus for inspecting a semiconductor sample, comprising:
- illumination optics for simultaneously directing a plurality of incident beams at a plurality of azimuth angles towards a sample;
- collection optics for directing a plurality of field portions of scattered output light from two or more of the plurality of angles towards two or more corresponding sensors, wherein the collection optics comprise a field splitter for splitting an intermediate field of the output light into the plurality of field portions, wherein there are eight or more azimuth angles and two to four field portions that reach the sensors;
- the two or more sensors for receiving the field portions corresponding to two or more angles and generating two or more corresponding images; and
- a processor for analyzing the two or more images to detect defects on the sample.

14. The apparatus of claim 13, wherein the field splitter is configurable to split the field into different two to four field portions that correspond to different two to four ones of the angles.

15. The apparatus of claim 1, wherein the collection optics comprises individual Fourier filters that are individually configurable for each field portion.

16. The apparatus of claim 1, wherein the collection optics comprises individual pupil filters that are individually configurable for each field portion.

17. The apparatus of claim 1, wherein the collection optics comprises individual polarizer filters that are individually configurable for each field portion.

18. The apparatus of claim 1, wherein the sample is a patterned wafer, and the illumination optics and the apparatus are configured to cause the incident beams at the plurality of angles to scan across a plurality of same swaths of the sample in a raster pattern, wherein the field portions are aligned along the scan direction of each swath.

19. The apparatus of claim 1, wherein the sample is a bare wafer, and the illumination optics and the apparatus are configured to cause the incident beams at the plurality of angles to scan across the sample in a spiral pattern and the field portions are not aligned in the scan direction.

20. The apparatus of claim 1, wherein the incident beams have an oblique angle of incidence.

21. The apparatus of claim 1, wherein the illumination optics and collection optics are configured for darkfield imaging.

22. An apparatus for inspecting a semiconductor sample, comprising:
- illumination optics for simultaneously directing a plurality of incident beams at a plurality of azimuth angles towards a sample;
- collection optics for directing a plurality of field portions of scattered output light from two or more of the plurality of angles towards two or more corresponding sensors, wherein the collection optics comprise a field splitter for splitting an intermediate field of the output light into the plurality of field portions;
- the two or more sensors for receiving the field portions corresponding to two or more angles and generating two or more corresponding images; and
- a processor for analyzing the two or more images to detect defects on the sample,
- wherein the illumination optics and collection optics are further configured for brightfield imaging, and wherein the sensors and collection optics are configured to have separate darkfield and bright field channels in addition to separate channels for receiving the field portions from different angles at each corresponding sensor.

* * * * *